March 5, 1940.  J. B. SOWA  2,192,698
TYPE REGISTERING BEAM FOR TRUCK WEIGHING SCALES
Filed March 7, 1938   3 Sheets-Sheet 1
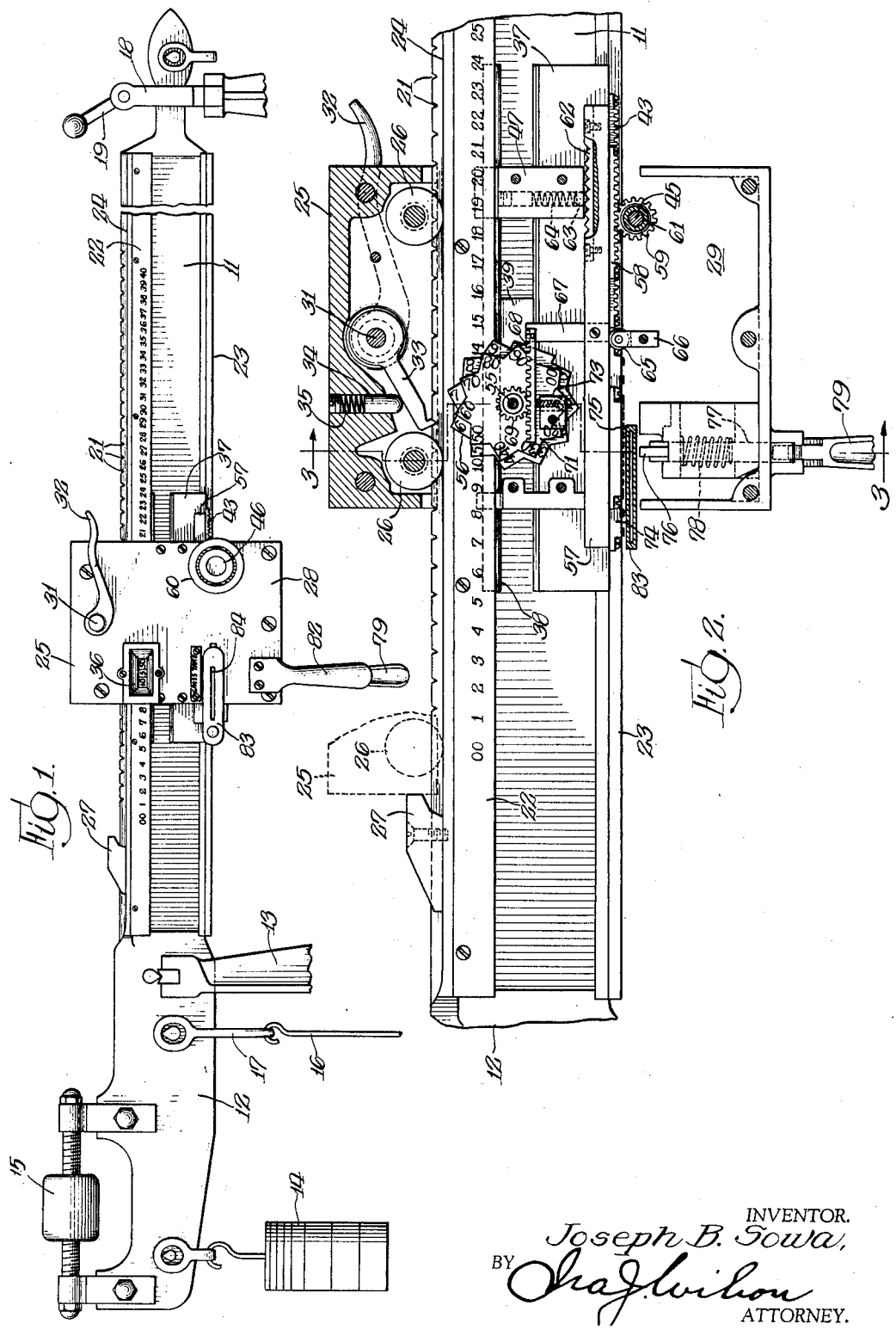
INVENTOR.
Joseph B. Sowa,
BY
ATTORNEY.

March 5, 1940. J. B. SOWA 2,192,698
TYPE REGISTERING BEAM FOR TRUCK WEIGHING SCALES
Filed March 7, 1938 3 Sheets-Sheet 2
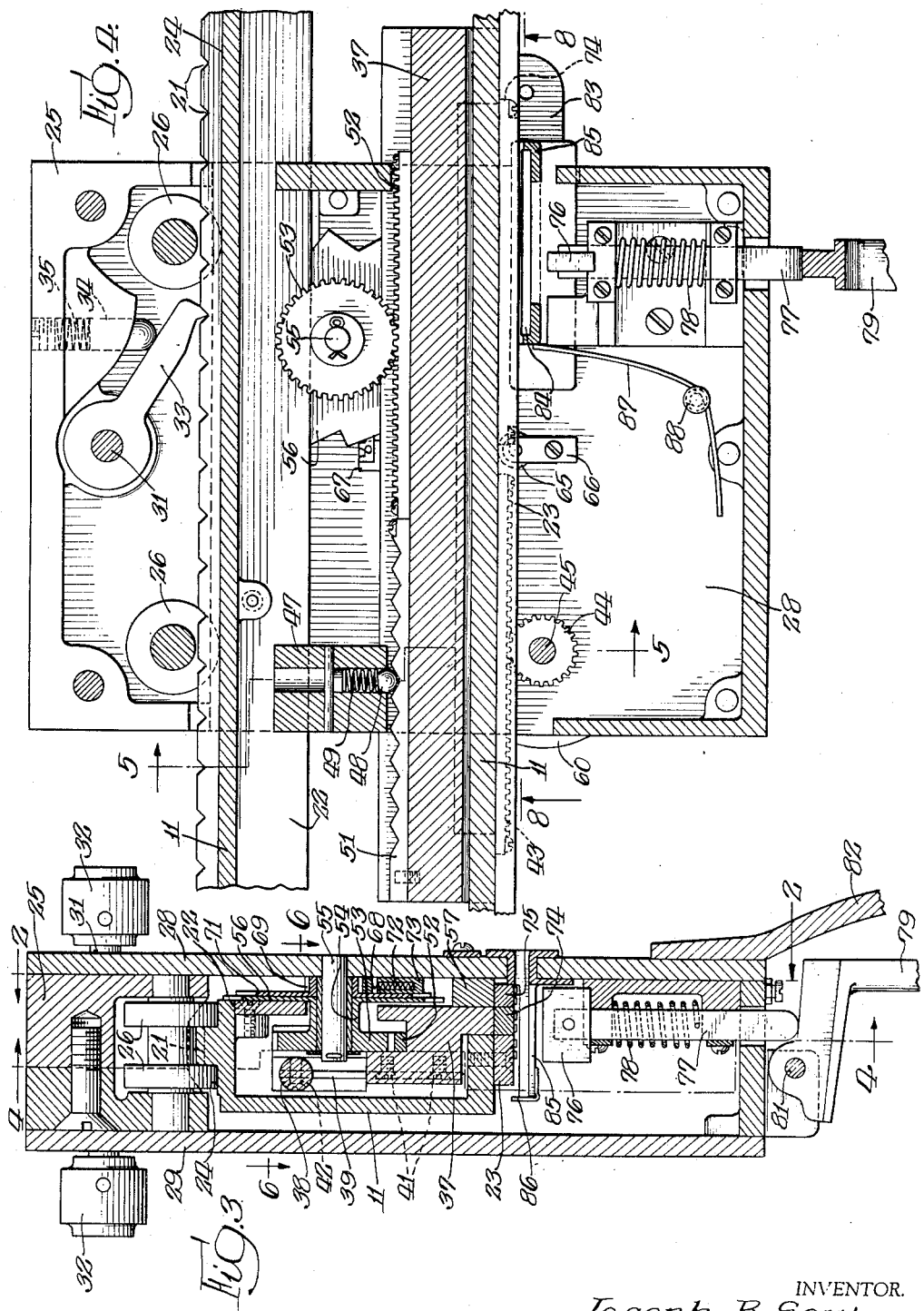
INVENTOR.
Joseph B. Sowa,
BY
ATTORNEY.

March 5, 1940. J. B. SOWA 2,192,698
TYPE REGISTERING BEAM FOR TRUCK WEIGHING SCALES
Filed March 7, 1938 3 Sheets-Sheet 3
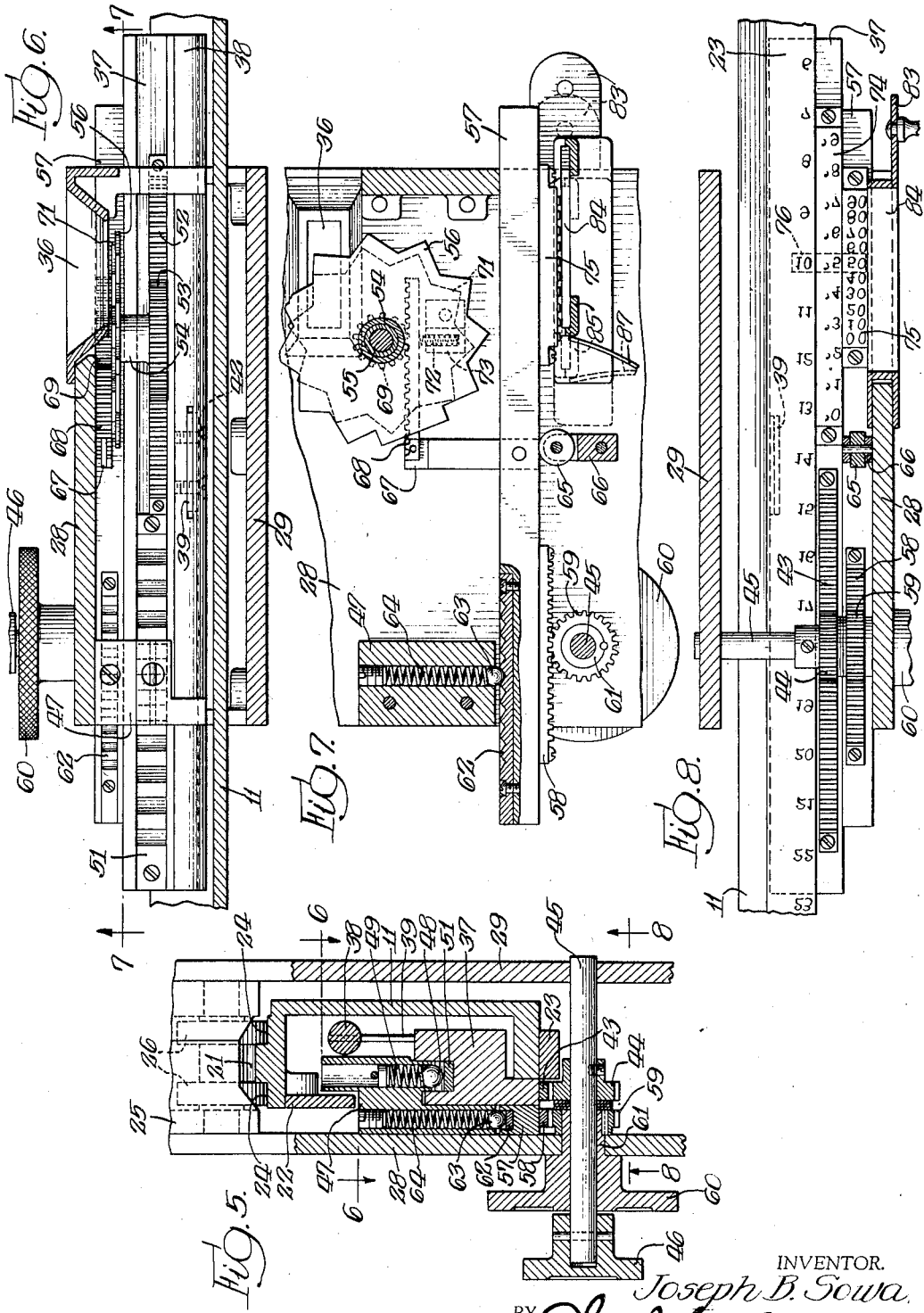
INVENTOR.
Joseph B. Sowa
BY
ATTORNEY.

Patented Mar. 5, 1940

2,192,698

UNITED STATES PATENT OFFICE 2,192,698

TYPE REGISTERING BEAM FOR TRUCK WEIGHING SCALES

Joseph B. Sowa, Delavan, Ill.

Application March 7, 1938, Serial No. 194,351

5 Claims. (Cl. 265—6)

This invention relates to weighing scales and more particularly to those of the heavy duty type such as are used in weighing heavily loaded trucks and which are adapted to weigh loads as heavy as sixty thousand pounds. The principles of my invention are, of course, applicable to smaller scales but are most advantageously utilized in the large, heavy duty type.

Before the advent of the modern heavy duty truck, the maximum requirement of the then called "wagon scales" was the ability to weigh a wagon with its load, the combined weight of which seldom exceeded a few thousand pounds. The weighing beam of such scales comprised a weighing frame or bar and an adjustable poise movable along the bar. In the smaller types each notch on the bar represented a pound. In the larger types an auxiliary frame or bar was employed in addition to the main frame, such auxiliary bar being also notched and an auxiliary poise being mounted upon this bar. In such instances, each notch on the main frame or bar represented one hundred pounds, and each notch on the auxiliary bar represented five pounds. The weighmaster in using such a scale would set the main poise to the nearest hundred pound notch, then move the auxiliary poise until a balance was obtained and then obtain the total weight by adding the weight indicated on the auxiliary bar to that indicated on the main bar.

As the size of the loads carried by trucks after motor trucks became common, increased beyond the capacity of the so-called "wagon scales," the length of the weighing bar or frame was for a time increased to meet the additional requirements. The length of these frames, however, soon became excessive, and the notches therein were required to be positioned so closely together that accurate weighing became increasingly difficult. Furthermore, the likelihood of error in reading the scale was constantly present by reason of the fact that two readings, one on each bar, was necessary, and in addition, a computation involving the adding of the two readings was required in order to obtain the actual weight indicated. The wagon scale, therefore, became utterly impractical for truck weighing purposes after the size of the trucks had been increased beyond fifteen tons capacity.

For the weighing of truckloads in excess of fifteen tons, the railroad track type of scale beam was developed. In this type, the length of the weighing frame or bar was reduced to reasonable proportions. The weight of the poise was increased to approximately thirty-five pounds and included an auxiliary or unit poise slidably mounted on the main poise. Each notch on the weighing frame or bar represented one thousand pounds, and each notch on the unit poise represented ten pounds, but since ninety-nine of these ten pound notches were required on the unit poise, this poise was necessarily of considerable length so that it projected when in its extreme position of adjustment in either direction a foot or more beyond the main poise upon which it was mounted. This fact prevented the main poise from approaching within a foot or more of either end of the main frame or bar, rendered this distance at each end of the bar useless for weighing purposes, and necessitated the placing of the weighing notches on this frame or bar quite close together in order to dispose them within the restricted length of the bar capable of use for weighing purposes. The closeness of the notches necessarily restricted their depth, and momentum of the heavy poise made the accurate positioning of the poise with respect to any notch extremely difficult, as it was likely to come to rest at one side or the other of the center of the notch, which resulted in considerable inaccuracy in the weighing, particularly as each notch represented one thousand pounds. Furthermore, the momentum of the heavy poise produced wear in the walls of the notches, thereby further contributing toward weight inaccuracy.

The likelihood of error in computing the weights was also present in this railroad track type of scale, because similarly to the old wagon scale employing two poises, the weighmaster was required to read the position of the main poise and also the position of the unit poise and add these readings to obtain the total weight. The likelihood of error is quite apparent when one considers that the notches on the main weighing frame or bar were located closely together and only each tenth one was designated by a number, and similarly, the notches on the units poise were disposed closely together and only each tenth one of these notches was designated by a number. The likelihood, therefore, of error in counting the notches between the numerals on both the main bar and the units poise bar is quite appreciable.

The purpose of my present invention is to overcome the objections inherent in heavy duty scales of the character above indicated. With this end in view I have provided a weighing beam structure in which a greater proportion of the main frame or bar may be utilized for the travel of the main poise, thereby enabling the notches to be spaced farther apart and made deeper to insure accurate positioning of the main poise. The main bar carries only the notches which represent a thousand pounds, and the intermediate notches each representing one hundred pounds are entirely omitted from the main bar.

The total weight of the main poise slidable along the beam frame or bar is only approximately fifteen pounds as compared with the thirty-five pound poise heretofore employed in heavy duty truck scales. Consequently, the momentum of the poise and the likelihood of its being inaccurately located with respect to any particular notch are correspondingly diminished. The main poise carries two instead of one auxiliary poises, one being known as the hundreds poise which represents those intermediate one hundred pounds, which have formerly been represented by the intermediate notches between the thousand pound notches on the main frame or bar. The other auxiliary poise is known as the units poise which represents those units between zero and one hundred pounds, heretofore represented by notches on the auxiliary poise. The hundreds poise and the units poise are both adjustably mounted on the main poise, but the maximum travel of each is only a fraction of the travel of the single auxiliary poise heretofore employed, so that neither of these poises in either extreme position projects any substantial distance beyond the main poise. The main poise is therefore enabled to travel much nearer to each end of the main frame or bar than was possible in previous constructions, wherein the auxiliary poise projected a foot or more beyond the main poise. This additional range of travel of the main poise enables a wider spacing of the thousand pound notches on the main bar than has heretofore been possible, which results in increased accuracy for the reasons above pointed out.

My invention further contributes toward accuracy in reading by eliminating entirely the reading of two distinct and separated scales or indicators and the adding of the observed indications together to get the total weight, by providing a single indicator upon which the total weight is clearly shown and from which it may be read at a single glance without any computation whatsoever. The weight shown on this indicator is a composite of a thousands number determined by the position of the main poise on the main frame or bar, a hundreds number determined by the position of the hundreds poise, and a units number determined by the position of the units poise. When the three poises have been adjusted to secure a balance of the load being weighed, the three numbers, namely, thousands, hundreds, and units are automatically positioned in proximity and in alignment where the total figure can be readily observed by the weighmaster.

In addition, my invention provides for type registering or printing the total weight on a weigh ticket, and for this purpose three number-carrying type bars arranged in proximity are provided, one fixed on the bottom of the main frame or bar, another attached to the hundreds poise, and the third attached to the units poise. Each of these type bars is provided with numbers so arranged that whatever number is shown on the indicator above referred to will be produced by the conjoint action of these three type bars when a platen, between which and said type bars a sheet of paper and a carbon sheet are interposed, is manually operated.

My invention, therefore, is designed for accurate weighing, for accurate reading of the weights, and for printing of the weights upon a sheet or ticket. It is simple in construction, durable in operation, and is capable of weighing loads up to sixty thousand pounds not only accurately but speedily, since the apparatus may be readily manipulated to quickly adjust the poises to balanced position.

Other purposes and many of the attendant advantages of my invention should be readily appreciated as the same becomes better understood by reference to the following description when considered in connection with the accompanying drawings.

Referring to the drawings:

Fig. 1 is a side elevation of a weighing beam constructed in accordance with my invention;

Fig. 2 is a sectional view on the line 2—2 of Fig. 3;

Fig. 3 is a transverse sectional view on the line 3—3 of Fig. 2;

Fig. 4 is a sectional view on the line 4—4 of Fig. 3;

Fig. 5 is a sectional view on the line 5—5 of Fig. 4;

Fig. 6 is a horizontal sectional view on the line 6—6 of Figs. 3 and 5;

Fig. 7 is a fragmentary sectional view on the line 7—7 of Fig. 6; and

Fig. 8 is a view looking upwardly taken on the line 8—8 of Figs. 4 and 5.

Referring to the drawings more in detail and particularly to Fig. 1, it will be observed that the weighing beam comprises generally a main frame or bar 11 preferably of channel shape in cross section, the head 12 of which is supported upon a standard 13 and is equipped with the usual balancing weights 14 and 15. The load is applied to the beam from the platform through a link 16 and a clevis 17, and the end of the bar is limited in its movements by a yoke 18 equipped with the usual weighted latch 19. The upper face of the bar is provided with notches 21 spaced apart a considerable distance, as shown, and upon the face of the bar is mounted a number plate 22 provided with numerals spaced equidistant with the notches 21 so that each numeral bears a fixed relation to a corresponding one of said notches and each numeral represents one thousand pounds. The bottom face of the bar is provided with a type plate 23 carrying corresponding type numerals, as shown in Fig. 8, by which the weight in thousand pounds of the load may be printed upon a ticket in a manner later to be described.

The top of the bar at each side of the central notched portion provides a track 24 upon which the main poise, indicated generally by 25, may travel back and forth upon the bar, four carrying rollers 26 being mounted upon a pair of shafts journalled in the side walls of the poise for antifrictionally carrying the poise along the bar. An abutment 27 is fixed on the top of the bar to limit the movement of the main poise toward the head of the bar, as exemplified in Fig. 2.

The main poise, which carries and therefore includes in its weight the hundreds poise, the units poise, and the type printing mechanism, together with the operating mechanisms for these various elements, comprises primarily the face plate 28, the rear plate 29, and the interposed walls between these plates forming the top, bottom and ends of the poise. The weight of the poise is carried by the rollers 26, as previously explained, and near its top, the poise is equipped with a transverse shaft 31 journalled in the front and rear walls and on the outwardly projecting ends of which are pinned or otherwise fixedly mounted a pair of operating handles or levers 32. Within the poise housing a pawl or latch 33 is fixedly mounted upon the shaft 31, and a plunger 34 under the influence of spring 35 urges the toothed end of the pawl into any notch 21 aligned therewith to thereby lock the poise with accuracy in any adjusted position along the bar or frame 11. The poise may be released for adjustment purposes by pressing downwardly upon either or both of the levers 32 to thereby withdraw the pawl from its engaged notch against the force of spring 35.

It will be observed particularly from Fig. 4 that the notches 21 are of substantial depth so that the correspondingly shaped tooth of the latch 33 will firmly seat in the notches and securely retain the poise against accidental movement in either direction. Furthermore, the acute angle of the notch walls insures that the latch will be fully seated and therefore accurately centered in each notch under the influence of the relatively strong spring 35. The construction, therefore, insures accurate positioning of the main poise in each locked position of adjustment and the ease of accurate positioning is further augmented by the fact that the main poise and all of the parts carried thereby is light in weight, that is, its entire weight, as previously mentioned, has only approximately fifteen pounds as compared with a weight of thirty-five pounds, which is customary for the poises in the railroad track type of scales designed for the same service.

It will also be observed that the notches 21 are spaced a substantial distance apart, thereby eliminating all likelihood of error regarding the identity of the particular notch to which the poise is locked. Each notch, as previously explained, represents one thousand pounds, and each notch is represented on the number bar 22 by a corresponding figure which is presented to view through a sight opening 36 in the front plate 28. In the position of adjustment illustrated in the drawings, the pawl 33 is engaged in the tenth notch from the head end of the bar 11, and numeral ten on the bar 22 is therefore presented to view at the left side of the sight opening 36, as shown in Fig. 1. Accurate positioning of the main poise is therefore insured, and error in reading its position is obviated by eliminating the counting of intermediate notches on the bar between numbered notches, as has heretofore been necessary, and by presenting conspicuously to view a numeral which designates with certainty the particular notch in which the main poise is located.

The hundreds poise, which is employed to represent the intervening nine-hundred pound divisions between the thousand pound notches which divisions have heretofore been represented by nine closely spaced notches on the main weighbar adjacent to the thousand pound markings, is slidably carried by and mounted within the housing of the main poise. This hundreds poise consists of a bar 37 exceeding somewhat the length of the main poise housing and shaped in cross section, as shown in Figs. 3 and 5. The weight of the bar is carried by the end walls of the main poise housing through a rod 38 mounted for sliding longitudinal movement in guide openings formed in these walls, the rod being rigidly connected with the poise bar 37 by a plate 39 secured to the bar by screws 41 and to the rod by screw 42. The rod is slotted to receive the upper end of the plate, as shown in Figs. 3, 5 and 6.

A rack 43 is anchored by screws or other fastening means to the lower face of poise bar 37 near one end thereof in position to mesh with and be actuated by a pinion 44 fixed on a shaft 45 to the forward projecting end of which is secured a knurled operating wheel 46. By turning this wheel in one direction or the other, the poise bar may be adjusted longitudinally of the main poise housing.

A cored inward projection 47 of one of the end walls of the main poise housing carries a spring pressed latch ball 48 which is urged by spring 49 into engagement with the notches of a bar 51 on the upper face of the poise bar. These notches and cooperating ball determine the stopping positions of the poise bar when adjusted and retain the bar against accidental displacement from any position of adjustment. The upper face of the poise bar is also equipped with a rack 52 which meshes with and rotates a pinion 53 carried by a sleeve 54 rotatably mounted on a stub shaft 55 and carrying also a disk 56 provided with numerals from zero to nine on its forward face and positioned rearwardly of the sight opening 36 in the front plate so that at each adjustment of the hundreds poise bar one of these numerals will be positioned for observation through the sight opening and adjacent to and in alignment with the thousands numeral presented through the sight opening by the bar 22. The position of the numeral 5 indicating hundreds adjacent to the numeral 10 indicating thousands will be apparent from Fig. 2.

The units poise also carried by the main poise comprises a bar 57 slidable longitudinally of the main poise through openings in the end walls thereof, the bar being provided on its bottom face near one end with a rack 58 meshing with a pinion 59 on a sleeve 61 projecting through the front plate 28 from a knurled knob 60 rotatably disposed upon the shaft 45.

Above the rack 58 poise bar 57 is equipped with a notched bar 62 against which a ball 63 is urged by an expansion spring 64 positioned in a socket formed in the housing extension 47. The ball cooperating with the notches frictionally holds the poise bar in any adjusted position and insures that the bar will come to rest each time at a predetermined point to present the printing type and the visible numbers in proper relation to the numerals of the main and the hundreds poises. The weight of the bar 57 is primarily carried by a roller 65 mounted in a bracket 66 attached to the front plate 28. A post 67 rigidly attached to and rising from the bar 57 has pivotally mounted thereto at its upper end a rack 68 which meshes with a pinion 69 rotatable upon the stub shaft 53 and rigidly connected with a disk 71 carrying numerals upon its front face in multiples of ten and adapted to align with the thousands numerals on the bar 22 and the hundreds numerals on the disk 56 so as to be visible simultaneously with these numerals through the sight opening 36, as will be apparent from Figs. 1 and 2. The rack 68 is yieldingly urged into meshing relation with the pinion 69 by a spring 72 located in a socket member 73 carried by the front plate 28. This insures a proper meshing relation between the rack and the pinion without lost motion and without imposing frictional resistance to the adjusting movements of the units poise.

It has previously been explained that the bottom face of the main frame or weighbar 11 is provided with a type bar 23 carrying the raised printing numerals spaced apart commensurately with the spacing of the notches 21 on this bar. The bottom face of the hundreds poise 37 is similarly provided with a plate 74 bearing numerals from zero to nine inclusive, as shown in Fig. 8, spaced equally with the spacing of the notches in the latching bar 51, and similarly, the bottom face of units poise bar 57 is provided with a type plate 75 provided with numerals from zero to ninety inclusive in units of tens, the spacing of these numerals being equal to the spacing of the notches in the notched latching bar 62.

The parts are all so coordinated that when the three poises are in any position of adjustment, the weight on the platform scale, which is balanced by the adjusted positions of the poises, will be instantly observable through the sight opening 36, and at the same time, the corresponding numerals on the type plates 23, 74 and 75 will be aligned for printing purposes within the area indicated by the dotted outline 76 in Fig. 8. In other words, when the main poise 25 is latched in the tenth notch of the main bar 11, which represents ten thousand pounds, the numeral ten on the bar 22 will be presented at the left of the sight opening 36, and numeral 10 on the printing plate 23 will be presented in printing position. When the hundreds poise is in adjusted position so that latching ball 48 is seated in the fifth notch of bar 51, as illustrated on the drawings, disk 56 will be positioned to present numeral 5 in proximity to the numeral 10 through the sight opening 36, and printing numeral 5 on printing plate 37 will be presented in alignment with numeral 10 on printing plate 23. So also when the units poise 57 is adjusted so that latching ball 63 is engaged in the fifth notch in the bar 62, numeral 50 on disk 71 will be presented in alignment with sight opening 36, and numeral 50 on printing bar 75 will also be presented in alignment with numerals 10 and 5 on plates 23 and 74 respectively. The weighmaster can ascertain at a glance, therefore, that the balanced weight is 10,550 pounds by observing the numerals presented through the sight opening 36. If he now desires to print the weight on a ticket or similar record, the printing is done by the three aligned numbers on the printing plates in the following manner.

Beneath and in alignment with the aligned numerals on the three printing plates, a platen 76 is mounted upon a vertically reciprocable post 77 which is held in the depressed position shown in Fig. 3 by an expansion spring 78. The lower end of the post projects through the bottom wall of the main poise housing in position to be forced upwardly by a hand lever 79 fulcrumed at 81 and positioned in cooperative relation to a stationary grip bar 82.

A ticket carrier and guide 83 (Fig. 1) provided with a slot 84 into which a ticket may be inserted includes a pair of supporting arms 85 (Fig. 3) terminating in upturned stops 86 which limit the insertion of the ticket, which is supported by the arms in position between the platen and the top plates. The printing is effected by grasping the handles 79 and 82 and pinching them together or, in other words, moving the handle 79 to the right viewing Fig. 3, thereby forcing the platen upwardly to press the ticket against the aligned numerals on the three type plates. A sheet of carbon paper of the same size as the ticket inserted into the slot therewith prints an impression upon the ticket under the pressure of the platen. With the setting illustrated in the drawings, the figure printed on the ticket will be 10,550 which corresponds with the number presented through the sight opening 36.

In order that both the tare and the gross, that is, the respective weights of the empty and loaded trucks may be printed on the same ticket, the ticket guide and support 83 is transversely adjustable in the main poise housing. That is, it may be adjusted on the main poise housing from the full line position to the dotted line position shown in Fig. 7. The guide is normally maintained in its full line position by the coil spring 87 mounted on the pin 88, one leg of the spring being engaged with a side of the ticket guide as shown. In this position, the gross weight will be printed on the ticket and when a record of the tare is required, the guide will be slid to the right viewing Fig. 1 and to the left viewing Fig. 4, to present another portion of the ticket between the platen and the aligned numbers which will be printed on the ticket upon actuation of the platen.

It will be apparent from the foregoing that I have provided a scale beam for heavy duty scales embodying many features of novelty which contribute toward accuracy in weighing, eliminate all computations by the weighmaster in obtaining the weight, present the weight in figures in one readily observable position from which it may be ascertained at a glance, and provide for printing the weight on a ticket by the simple manipulation of a hand lever.

For the purpose of exemplifying the principles of my invention, I have illustrated and described that embodiment thereof which at present seems preferable, but it should be understood that the structural details disclosed are illustrative merely of these principles and that the physical embodiment thereof may be varied within considerable limits without departing from the essence of my invention as defined in the following claims.

I claim:

1. In a scale beam, the combination of a weighbar, a main poise adjustable longitudinally of said bar, an elongated number plate rigidly mounted on the bar for indicating in thousand pound units the adjusted position of said main poise, a hundreds poise carried by said main poise and adjustable longitudinally of said bar, an indicating element controlled by said hundreds poise for indicating in hundred pound units the adjusted position of said hundreds poise, a units poise carried by said main poise and adjustable longitudinally of said bar, and an indicating element controlled by said units poise for indicating fractions of hundred pounds, said indicating elements being arranged in cooperative proximity to said number plate to present to view as a single number the composite indications of said plate and elements.

2. In a scale beam, the combination of a weighbar provided with spaced apart notches, each representing one thousand pounds, an elongated number plate mounted on said bar and provided with numerals spaced longitudinally of the plate in conformity with said notches and arranged in consecutive order, a main poise adjustable longitudinally of said bar, locking means carried by said poise engageable in said notches to lock the poise in adjusted position, said poise being provided with a sight opening through which the numeral on said number plate corresponding with the notch to which said poise is locked may be observed, an auxiliary poise carried by and adjustable relatively to said main poise, an indicating element operable by said auxiliary poise to present to view through said sight opening a numeral corresponding with the adjusted position of said auxiliary poise, a second auxiliary poise carried by and adjustable relatively to said main poise, and an indicating element operable by said second auxiliary poise to present to view through said sight opening a numeral corresponding to the adjusted position of said second auxiliary poise, the parts being so proportioned and arranged that the composite number presented to view through said sight opening by said number plate and said indicating elements represents the weight which will be counterbalanced by said bar with the main and auxiliary poises in the positions of adjustment indicated.

3. In a scale beam, the combination of a weighbar, a main poise comprising a housing surrounding said bar and adjustable longitudinally thereof, a supporting rod slidably mounted in said housing, an auxiliary poise suspended from said rod and adjustable longitudinally of the housing, means for adjusting the position of said auxiliary poise relatively to said housing, means for yieldably holding said auxiliary poise in adjusted position, a rack mounted on said auxiliary poise, a pinion meshing therewith to be actuated thereby, an indicator disk fixedly connected with said pinion, a second auxiliary poise slidably mounted in said housing, means for adjusting the position of said second poise relatively to the housing, a rack pivotally mounted on said second poise, a pinion meshing therewith, means for yieldingly urging said last mentioned rack into meshing relation with said last mentioned pinion, an indicator disk fixedly connected with said last mentioned pinion, and an indicator bar mounted on said weighbar, said housing being provided with a sight opening through which a numeral on said indicator bar and a numeral on each of said indicator disks may be simultaneously observed in proximate relation to form a composite weight indicating number.

4. In a scale beam, the combination of a weighbar provided on its upper face with a pair of spaced tracks and an intermediate rib provided with a series of spaced apart notches, a main poise comprising a housing surrounding the weighbar, rollers positioned to travel upon said tracks whereby said poise is adjustably supported upon the weighbar, a spring pressed pawl engageable in said notches to lock said poise in adjusted position, a rod slidably supported by said housing, an auxiliary poise carried by said rod, means for adjusting said auxiliary poise longitudinally of said housing, a second auxiliary poise adjustably mounted on said main poise, means for adjusting said second poise longitudinally of the housing, an indicator bar mounted on said weighbar, indicator disks connected with said auxiliary poises so as to be rotated thereby upon adjusting movement of said poises, said disks being disposed in proximity to said indicator bar, so that the exposed numerals on the weighbar and said disks form together a composite weight indicating number, a type plate mounted on said weighbar, type plates mounted upon said respective auxiliary poises in proximity to the weighbar type plate, and means cooperating simultaneously with said type plates for producing a single printed number from the three type plates, the type plates and indicator elements being so related that the number printed by the three type plates will be a duplicate of the number composed by the three indicator elements.

5. In a scale beam, the combination of a weighbar provided with spaced apart notches, each representing one thousand pounds of weight to be balanced, a main poise mounted on and adjustable longitudinally of said bar, means engageable in said notches for locking said poise in adjusted position, a hundreds poise carried by and adjustable relatively to said main poise, a units poise mounted on and adjustable relatively to said main poise, an elongated number plate stationarily mounted on said weighbar, an indicating element operable by said hundreds poise, an indicating element operable by said units poise, said hundreds and unit indicating elements being mounted on said main poise in proximity to each other and to said weighbar number plate so that the adjacent indications of said plate and elements form a composite number showing the determined weight total.

JOSEPH B. SOWA.